Sept. 16, 1969    J. F. WESTFALL ETAL    3,467,320
SHREDDING MACHINE
Filed Dec. 5, 1966    2 Sheets-Sheet 1
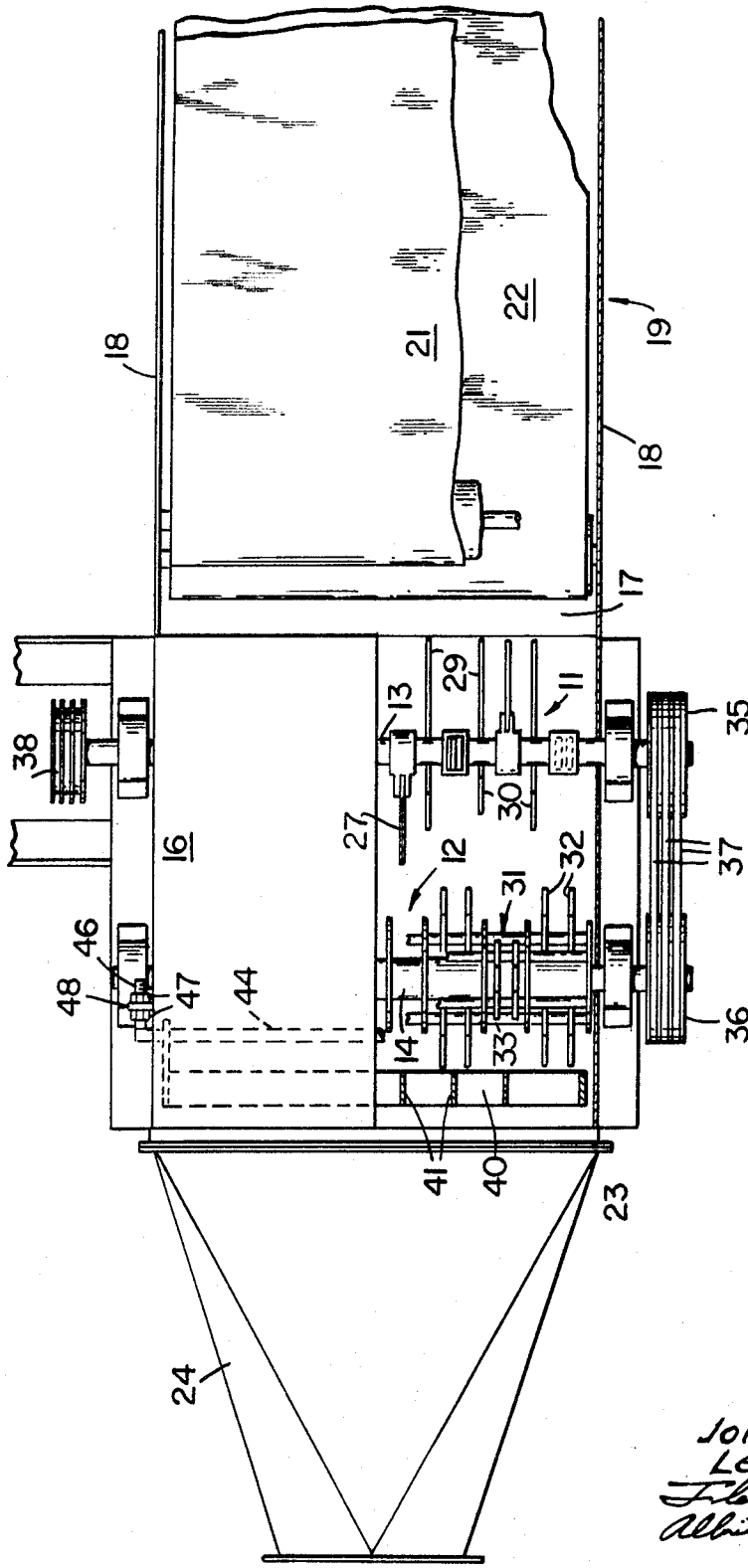
FIG_1
INVENTORS
John F. Westfall.
Leo E. Soukko.
Files, Hohbach, Test,
Albritton and Herbert
ATTORNEYS

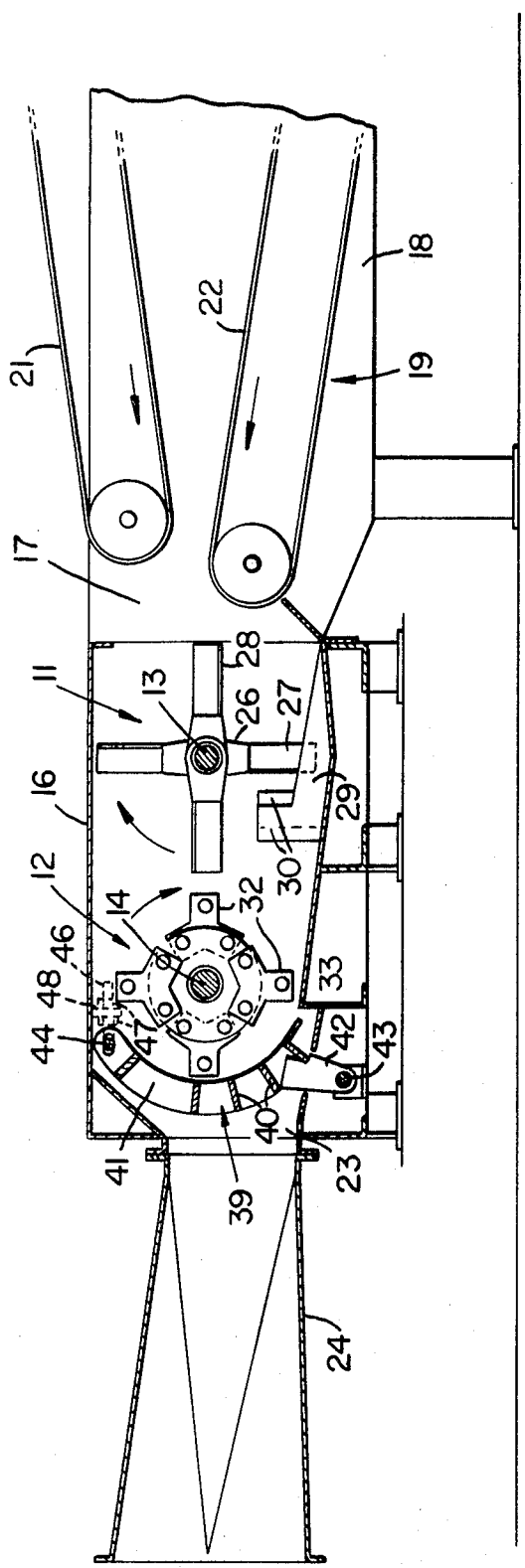
FIG_2

United States Patent Office 3,467,320
Patented Sept. 16, 1969

3,467,320
SHREDDING MACHINE
John F. Westfall, San Jose, and Leo E. Saukko, Castro Valley, Calif., assignors to Safeway Stores, Incorporated, Oakland, Calif., a corporation of Maryland
Filed Dec. 5, 1966, Ser. No. 599,017
Int. Cl. B02c 17/02, 9/04, 19/00
U.S. Cl. 241—89                              5 Claims

ABSTRACT OF THE DISCLOSURE

A machine for shredding fiberboard cartons. Two shredding rotors are disposed side by side. The cartons to be shredded are fed to one side of the first stage rotor, and this rotor feeds the second stage rotor. Grid bars cooperate with the second rotor to break down the corrugations of the fiberboard.

---

This application relates generally to machines for shredding fiberboard cartons, having reference particularly to cartons made from fiberboard of the corrugated type.

It is common practice to dispose of used fiberboard cartons by reducing them to shredded material, after which the material is compressed into bales for shipment or other disposition. The machines which have been available for this purpose consist of a shredding rotor having cutting blades which are capable of cutting the fiberboard material into shreds. Provision is made for feeding cartons against one side of the rotor. The housing in which the rotor is disposed has an outlet opening connected to a blower or fan to facilitate movement of the shreds through the zone of operation of the rotor. This type of shredding machine has been found unsatisfactory in many instances because it does not effectively crush the corrugations of the fiberboard. Thus when shreds produced by such a machine are compressed in a conventional baling machine, the density of the baled material is lower than is desired.

It is an object of the present invention to provide an improved shredding machine which is capable of producing shreds from corrugated fiberboard cartons which have the corrugations crushed. Such shreds produce bales of higher density, using the same compression forces.

Another object of the invention is to provide a shredding machine of the above character which carries out shredding in two stages by the use of two side-by-side rotors, with the second rotor cooperating with grid bars to ensure crushing of the corrugations.

Additional objects and features of the invention will appear from the following specification in which the preferred embodiment of the invention has been disclosed in conjunction with the accompanying drawing.

In accordance with the present invention we provide two shredding rotors disposed side-by-side within a housing. Both rotors are driven by a suitable motor or other source of power. Means is provided for feeding the cartons to be shredded against one side of the first stage rotor. The shredded material produced by this rotor is fed into the zone of operation of the second stage rotor. Stationary grid bars cooperate with the second stage rotor to ensure crushing of corrugations. Feed of shredded material from the first to the second stage rotor, and from the second rotor through a discharge outlet, is ensured by use of a blower or like means connected to the discharge opening of the housing.

Referring to the drawing:

FIGURE 1 is a plan view showing a machine incorporating the present invention;

FIGURE 2 is a side elevational view of the machine shown in FIGURE 1, and in section.

The machine illustrated in the drawing consists of the first and second stage shredding rotors 11 and 12 which are disposed side-by-side and mounted upon the driven shafts 13 and 14. Both rotors are disposed within a housing 16 which may be of fabricated construction. The housing has an opening 17 through which material is fed to one side of the rotor 11. Also the side walls of the housing have extensions 18 between which the carton feed device 19 is disposed. This feed device can be of conventional construction, consisting of the endless belts 21 and 22 carried by suitable sheaves, and between which the cartons are advanced toward the rotor 11. The belts are disposed to converge as illustrated whereby the cartons are somewhat collapsed while being advanced. The lower conveyor belt is driven by suitable means not shown. Such feed devices are well known and are used in prior shredding machines, as previously described.

The housing 16 also has a discharge opening 23 through which the shredded material is discharged. This opening is shown connected with a transition conduit 24 which in turn can connect to the suction side of a suitable blower. The blower in turn may deliver the shredded material to equipment which collects the material and compresses it into bales.

The rotor 11 is shown consisting of a hub assembly 26 which carries a plurality of radially extending cutting blades 27. The advancing cutting edges 28 of the blades serve to shred the cartons fed into the zone of operation of the rotor by the feed device 19. It will be noted that the blades 27 are angularly spaced, and they are also spaced along the length of the rotor shaft 13 as shown in FIGURE 1. Stationary comb members 29, which have vertical extensions 30, are positioned between the blades.

The second stage rotor 12 consists of a hub assembly 31 which carries a plurality of blades or hammers 32. These hammers are likewise spaced angularly about the shaft 14, and spaced longitudinally as shown in FIGURE 1. The individual hammers are shown removably carried by rods 33, which in turn are carried by the disks of the assembly. Both rotors 11 and 12 are driven in the same direction as illustrated in FIGURE 2. The shafts may be directly connected by sheaves 35 and 36 and the drive belts 37, as shown in FIGURE 1. One shaft is shown provided with sheave 38 which is connected by belts to a suitable motor (not shown).

On that side of the rotor 12 remote from the rotor 11 there is a grid bar assembly 39. This assembly consists of a plurality of grid bars 40 together with the arcuate bars 41. The grid bars 40 are disposed in planes coincident with the axis of shaft 14. Also they are disposed with their edges relatively close to the zone of operation of the hammers 32. As shown in FIGURE 1, the bars 40 extend completely across the machine, and they are secured at spaced points to the arcuate bars 41. The lower end portions 42 of the bars 41 are shown secured to a shaft 43 which in turn is carried by the base of the housing. The upper ends of the bars 41 are attached by adjustable means to the housing. Thus all of the bars 41 are connected together by the rod 44. The extremities of this rod are attached to the thread rods 46. These rods in turn are adjustably held by nuts 47 to the brackets 48. It will be evident that the construction just described permits the grid bar assembly to be adjusted with respect to the rotor 12 whereby the grid bars can be brought into close apposition with the zone of operation of the rotor.

Operation of the machine is as follows. The first and second stage rotors 11 and 12 are driven in the same direction as previously described. Suction is continuously applied to the discharge conduit 24. The conveyor belt 22 is driven at a suitable speed whereby cartons placed upon this conveyor are carried forwardly and subjected to some crushing by engagement with the overlying belt 21.

As the carton moves into the zone of operation of the first stage rotor 11, it is shredded by the knives 27, and the shreds are carried into the second stage rotor 12. The second stage rotor subjects the shreds to some further subdivision, and also subjects the shreds to repeated impacts by virtue of the action of the bars 39. This serves effectively to crush the corrugations of the fiberboard. After passing through the grid assembly, the shreds are carried to the collecting and baling equipment.

It will be evident from the foregoing that the machine provides effective means for shredding fiberboard cartons, and particularly cartons using corrugated fiberboard. Because the corrugations of the shreds are effectively crushed, the shreds can be packed into a denser bale with bale compaction forces comparable to what has been used in the past.

We claim:

1. In a machine suitable for shredding corrugated fiberboard cartons, the machine being of the type wherein carton feeding means serves to advance the cartons against a shredding rotor disposed within a housing, the improvement comprising first and second shredding rotors disposed side by side, a housing enclosing the rotors and having an opening for the discharge of shredded material, means for driving both said rotors, means for advancing cartons to be shredded against one side of the first rotor with shredded material from the first rotor being fed to the adjacent side of the second rotor, the housing including generally parallel wall portions between which the rotors extend and in proximity therewith and stationary grid bars disposed adjacent that side of the rotor remote from the first rotor and extending through the space between the wall portions whereby substantially all of the discharging shredded material is caused to pass therethrough said grid bars cooperating with said second rotor for the effective shredding of the material and for crushing corrugations.

2. A machine as in claim 1 in which said grid bars comprise a plurality of rigid bars extending for the entire length of the second rotor and disposed in proximity with the zone of operation of the second rotor, and mounting means attached to the grid bars and secured to the housing.

3. A machine as in claim 2 in which said mounting means consists of a plurality of arcuate shaped bars attached to said grid bars, and means attached to said arcuate bars for adjusting the position of the grid bars relative to the second rotor.

4. In a machine suitable for shredding corrugated fiber cartons, the machine being of the type wherein carton feeding means serves to advance the cartons against a shredding rotor disposed within a housing, the improvement comprising first and second shredding rotors each having radially extending and axially spaced shredding knives, the rotors being disposed side by side with their shredding knives in non-meshing relationship and rotatable about parallel axes, a housing having substantially flat parallel wall portions between which the rotors are disposed and which are in spaced proximity to the knives of the rotors, means for advancing cartons to be shredded against one side of the first rotor with the shredded material from the first rotor being fed to the adjacent side of the second rotor, said housing having a discharge opening through which the shredded material can be withdrawn by suction, the opening being on that side of the second rotor which is remote from that side of the first rotor to which the cartons are advanced, stationary comb members disposed between the knives on the first rotor, means for driving the two rotors in the same direction and a grid bar assembly disposed adjacent that side of the second rotor which is faced toward the discharge opening, said assembly extending between said parallel wall portions of the housing and including spaced grid impact bars acting to crush corrugated fiberboard by repeated impacts of the fiberboard on the same.

5. A machine for shredding corrugated fiberboard cartons as in claim 4 in which the grid bar assembly includes arcuate bars secured to the grid impact bars, the grid impact bars extending generally parallel to the axis of the second rotor and the arcuate bars extending between said parallel wall portions, means adjacent to one of the parallel wall portions for adjustably mounting the corresponding ends of the adjacent to the other one of the parallel wall portions for retaining the other corresponding ends of the arcuate bars, said last means permitting adjustment of the grid bar assembly toward or away from the second rotor.

References Cited

UNITED STATES PATENTS

| 2,767,928 | 10/1956 | Hanse et al. | 241—154 X |
| 2,894,697 | 7/1959 | Panning et al. | 241—154 |
| 3,224,688 | 12/1965 | Beiter | 241—154 |

WILLIAM S. LAWSON, Primary Examiner

U.S. Cl. X.R.

241—154